(12) United States Patent
Li et al.

(10) Patent No.: US 8,963,767 B2
(45) Date of Patent: Feb. 24, 2015

(54) METHOD FOR DETECTING THE MOTION OF OBJECT BY ULTRA-WIDEBAND RADAR IMAGING AND SYSTEM THEREOF

(71) Applicant: National Taiwan University, Taipei (TW)

(72) Inventors: Pai-Chi Li, Taipei (TW); Tsung-Chuan Chen, Taipei (TW)

(73) Assignee: National Taiwan University, Taipei (TW)

( * ) Notice: Subject to any disclaimer, the term of this patent is extended or adjusted under 35 U.S.C. 154(b) by 268 days.

(21) Appl. No.: 13/726,274

(22) Filed: Dec. 24, 2012

(65) Prior Publication Data
US 2014/0125510 A1 May 8, 2014

(30) Foreign Application Priority Data
Nov. 2, 2012 (TW) .............................. 101140755 A (51) Int. Cl.
*G01S 13/58* (2006.01)
*G01S 13/02* (2006.01)
*G01S 13/50* (2006.01)
*G01S 13/89* (2006.01)

(52) U.S. Cl.
CPC .............. *G01S 13/0209* (2013.01); *G01S 13/50* (2013.01); *G01S 13/89* (2013.01)
USPC ............. 342/107; 342/28; 342/105; 342/109; 342/118

(58) Field of Classification Search
USPC ............................ 342/28, 105, 107, 109, 118
See application file for complete search history.

*Primary Examiner* — Timothy A Brainard
(74) *Attorney, Agent, or Firm* — Rosenberg, Klein & Lee (57) ABSTRACT

A method for detecting the motion of object by ultra-wideband radar imaging and system thereof to be used to present the motion of object in a reference gray-level image by using the delay time to analyze the distance between the detected position of object and the detecting position to compare the time-varying distance variation between the reference distance and the detecting distance. The system includes a transmitter module, a receiver module and a signal processing module. The transmitter module is used to transmit a first ultra-wideband signal from a detecting position to the object. The receiver module is used to receive a second ultra-wideband signal reflected from the object in the detecting position. The signal processing module is used to analyze the signal delay time of the second ultra-wideband signal received in the detecting position to analyze the detecting distance between the second ultra-wideband signal and the detecting position.

24 Claims, 4 Drawing Sheets

METHOD FOR DETECTING THE MOTION OF OBJECT BY ULTRA-WIDEBAND RADAR IMAGING AND SYSTEM THEREOF

FIELD OF THE INVENTION

This invention relates to a method for detecting the motion of object by ultra-wideband radar imaging and a system thereof, and more particularly relates to a method and a system thereof to present the motion of object in a gray-level image by the delay time to analyze the distance between the detected position of object and the measure position to compare the variation with time between the basic distance and the measure distance.

BACKGROUND OF THE INVENTION

For the conventional art, the detecting device needs to contact the surface of object for detecting the motion of object, however, this detecting method cannot be applied to the condition the contact to the surface of object is unavailable, e.g. for detecting physiological reaction of burned patient or for securing the hurt people under debris. Thus, plenty of researches were announced to detect motion of object by using ultra-wideband radar system.

In the prior art, the method for detecting the motion of object by using ultra-wideband radar system uses a transmitter module to transmit a ultra-wideband microwave signal to the object. When the object is in motion, receiving time of the ultra-wideband microwave signal reflected from the surface of object to the receiver module would be varied. The researches published before analyzed variation of receiving time of the ultra-wideband microwave signal to figure out if there is any object in motion in the range. However, the methods disclosed in the researches merely identify the distance between the object and the ultra-wideband radar, neither the 2D position of object in space nor the two objects of different location but with identical distance toward the ultra-wideband radar can be identified. In addition, these researches need to proceed the comparison of a first image and a second image to figure out the motion of object.

BRIEF SUMMARY OF INVENTION

The technical problem to be resolved and the object of the present invention:

The detecting method in prior art just identify the distance between the object and the ultra-wideband radar, neither the 2D or 3D position of object in space nor the two objects of different location but with identical distance toward the ultra-wideband radar can be identified, and the comparison of a first image and a second image should be proceed to figure out the motion of object.

To image the 2D or 3D position of object in space and real-time detect the motion of object, it is an object of the present invention to provide a method for detecting the motion of object by ultra-wideband radar imaging and a system thereof, which presents the motion of object in a gray-level image by the delay time to analyze the distance between the detected position of object and the measure position to compare the variation with time between the basic distance and the measure distance.

The technical feature of the present invention for solving the problem:

In order to solve the problem addressed in prior art, a necessary technological method for detecting method of object by using ultra-wideband radar imaging is provided in the present invention, which comprises the steps of: under an initial condition, transmitting at least a first ultra-wideband microwave signal from a plurality of detecting positions along a direction to a plurality of first detected positions of a object, the first detected positions being respective to the detecting positions; receiving at least a second ultra-wideband microwave signal at the detecting positions, the second ultra-wideband microwave signal being reflected from the first detected positions of the object; and analyzing a plurality of reference signal delay times for the second ultra-wideband microwave signal received at the detecting positions and analyzing a plurality of reference distances between the first detected positions and the respective detecting positions accordingly so as to generate a reference gray-scale image of the object.

Then under a detecting condition, transmitting the at least one first ultra-wideband microwave signal from the detecting positions along the direction to a plurality of second detected positions of the object, the second detected positions being respective to the detecting positions; receiving the at least one second ultra-wideband microwave signal at the detecting positions, the second ultra-wideband microwave signal being reflected from the second detected positions of the object; and analyzing a plurality of detecting signal delay times for the second ultra-wideband microwave signal received at the detecting positions, and analyzing a plurality of detecting distances between the second detected positions and the respective detecting positions accordingly; in the reference gray-scale image, comparing time-varying distance variations between the reference distances and the detecting distances with respective to the detecting positions; and presenting motion of the object in the reference gray-scale image according to the distance variations.

An ultra-wideband radar imaging system for detecting motion of object is also provided in the present invention. The system comprises a transmitter module, a receiver module, and a signal processing module. The transmitter module is utilized for transmitting a first ultra-wideband microwave signal from a plurality of detecting positions to a plurality of first detected positions of a object under an initial condition, and for transmitting the first ultra-wideband microwave signal from the detecting positions to a plurality of second detected positions of the object under a detecting condition. The receiver module is utilized for receiving at least a second ultra-wideband microwave signal at the detecting positions under the initial condition, the second ultra-wideband microwave signal being reflected from the first detected positions, and for receiving the second ultra-wideband microwave signal at the detecting positions under the detecting condition, the second ultra-wideband microwave signal being reflected from the second detected positions.

The signal processing module is electrically connected to the transmitter module and the receiver module for analyzing a plurality of reference signal delay times for the second ultra-wideband microwave signal received at the detecting positions under the initial condition so as to analyze a plurality of reference distances between the first detected positions and the respective detecting positions accordingly to generate a reference gray-scale image of the object, and for analyzing a plurality of detecting signal delay times for the second ultra-wideband microwave signal received at the detecting positions under the detecting condition so as to analyze a plurality of detecting distances between the second detected positions and the respective detecting positions accordingly. Wherein the signal processing module analyzes time-varying distance variations according to the reference distances and the respective detecting distances and presents motion of the object in the reference gray-scale image according to the distance variations.

As a preferred embodiment, the signal processing module includes a processing unit, which is utilized for generating and transmitting a digital square wave. The transmitting module comprises a transmitting unit and at least a transmitting antenna, the transmitting unit is electrically connected to the processing unit for receiving the digital square wave and modulating the digital square wave into the first ultra-wideband microwave signal so as to transmit the first ultra-wideband microwave signal. The transmitting antenna is electrically connected to the transmitting unit for receiving the first ultra-wideband microwave signal and transmitting the first ultra-wideband microwave signal to the object. The transmitting antenna may be selected from a group consisting of an one-dimensional array antenna and a two-dimensional array antenna, and may be assembled on a mechanical scanning device, and the mechanical scanning device is capable of moving along a direction selected from an one-dimensional direction and a two-dimensional direction to have the transmitting antenna transmitting the first ultra-wideband microwave signal at the detecting positions.

As a preferred embodiment, the receiver module comprises a receiving unit and at least a receiving antenna, the receiving unit is electrically connected to the receiving antenna, and the receiving antenna is utilized for receiving the second ultra-wideband microwave signal and transmitting the second ultra-wideband microwave signal to the receiving unit to have the receiving unit transmitting the second ultra-wideband microwave signal to the signal processing module. The receiving antenna may be selected from a group consisting of an one-dimensional array antenna and a two-dimensional array antenna, and may be assembled on a mechanical scanning device, which is capable of moving along a direction selected from an one-dimensional direction and a two-dimensional direction to have the receiving antenna receiving the second ultra-wideband microwave signal at the detecting positions.

The improvement of the present invention in compared with the prior art:

The conventional detecting methods disclosed in the researches merely identify the distance between the object and the ultra-wideband radar, neither the 2D or 3D position of object in space nor the two objects of different location but with identical distance toward the ultra-wideband radar can be identified. In addition, these methods need to proceed the comparison of a first image and a second image to figure out the motion of object.

In contrast, in order to identify the 2D or 3D position of object in space as well as the motion of object, the technological method disclosed in the present invention analyzes the detecting distance between the detected position of object and the detecting position by the signal delayed time and presents motion of the object in the reference gray-scale image according to the distance variations through comparing time-varying distance variations at the detecting positions between the reference distances and the respective detecting distances.

The embodiments adopted in the present invention would be further discussed by using the flowing paragraph and the figures for a better understanding.

DETAILED DESCRIPTION OF THE INVENTION

There are various embodiments of the method for detecting the motion of object by ultra-wideband radar imaging in accordance with the present invention, which are not repeated hereby. It should be understood by those skilled in the art that the better embodiments disclosed in the following paragraph are merely for example instead of restrict the scope of the invention itself.

Figure 1:
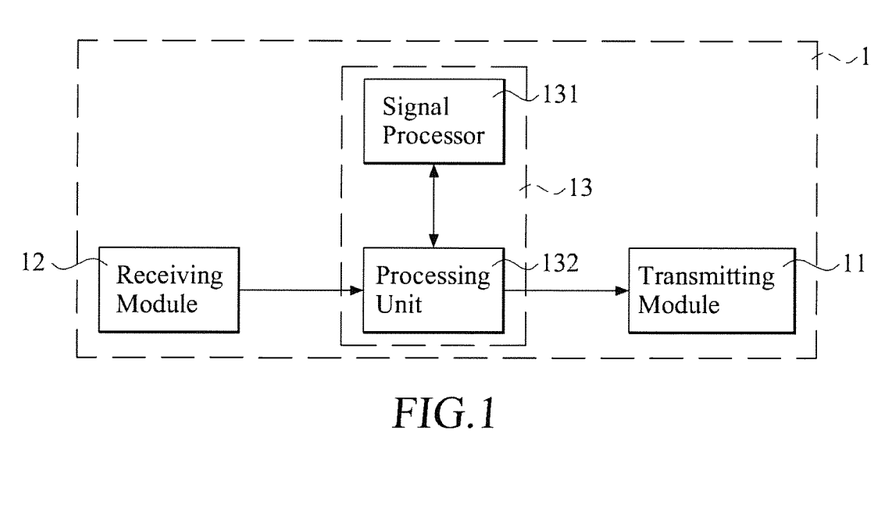
FIG. 1 is a schematic view showing a system architecture of the ultra-wideband radar imaging system in accordance with a first preferred embodiment of the present invention.

FIG. 1 is a schematic view showing a system architecture of an ultra-wideband radar imaging system in accordance with a first preferred embodiment of the present invention.

As shown in FIG. 1, the ultra-wideband radar imaging system 1 includes a transmitter module 11, a receiver module 12, and a signal processing module 13. The signal processing module 13 is electrically connected to the transmitter module 11 and the receiver module 12. The signal processing module 13 includes a signal processor 131 and a processing unit 132. The signal processor 131 is electrically connected to the processing unit 132.

The transmitter module 11 is utilized for transmitting a first ultra-wideband microwave signal from a plurality of detecting positions to a plurality of first detected positions of an object under an initial condition, and for transmitting the first ultra-wideband microwave signal from the detecting positions to a plurality of second detected positions of the object under a detecting condition.

The receiver module 12 is utilized for receiving at least a second ultra-wideband microwave signal reflected from the first detected positions at the detecting positions under the initial condition, and for receiving the second ultra-wideband microwave signal reflected from the second detected positions at the detecting positions under the detecting condition.

The signal processing module 13 is utilized for analyzing a plurality of reference signal delay time for the second ultra-wideband microwave signal received at the detecting positions under the initial condition so as to analyze a plurality of reference distances between the first detected positions and the respective detecting positions accordingly to generate a reference gray-scale image of the object, and for analyzing a plurality of detecting signal delay time for the second ultra-wideband microwave signal received at the detecting positions under the detecting condition so as to analyze a plurality of detecting distances between the second detected positions and the respective detecting positions accordingly.

Figure 2:
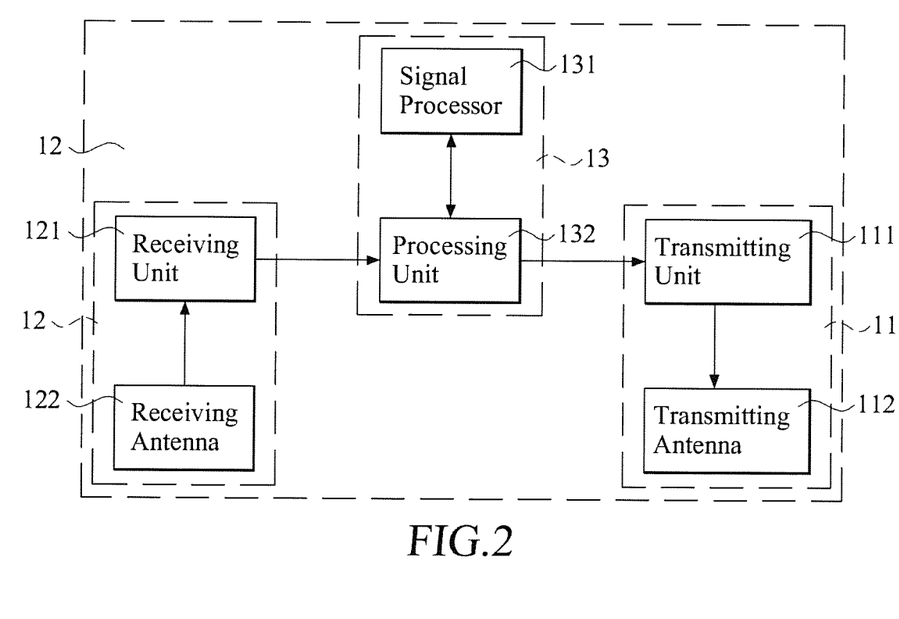
FIG. 2 is a schematic view showing a system architecture of the ultra-wideband radar imaging system in accordance with a second preferred embodiment of the present invention.

Please further referring to FIG. 2, which shows a schematic view of a system architecture of an ultra-wideband radar imaging system in accordance with a second preferred embodiment of the present invention.

As shown in FIG. 2, the ultra-wideband radar imaging system 1 includes a transmitter module 11, a receiver module 12, and a signal processing module 13. The signal processing module 13 is electrically connected to the transmitter module 11 and the receiver module 12. The signal processing module 13 includes a signal processor 131 and a processing unit 132. The transmitter module 11 includes a transmitting unit 111 and at least a transmitting antenna 112. The transmitting unit 111 is electrically connected to the processing unit 132. The transmitting antenna 112 is electrically connected to the transmitting unit 111. The receiver module 12 includes a receiving unit 121 and at least a receiving antenna 122. The receiving unit 121 is electrically connected to the receiving antenna 122. That is, the difference between the second preferred embodiment and the first preferred embodiment lies in the compositions of transmitter module 11 and the receiver module 12.

The transmitting unit 111 is utilized for receiving the digital square wave generated and transmitted by the processing unit 132 and modulating the digital square wave into the first ultra-wideband microwave so as to transmit the first ultra-wideband microwave. The transmitting antenna 112 is electrically connected to the transmitting unit 111 for receiving the first ultra-wideband microwave signal and transmitting the first ultra-wideband microwave signal to the object. Under the initial condition, the transmitting antenna 112 transmits at a plurality of detecting positions the first ultra-wideband microwave signal to a plurality of first detected positions of the object, and under the detecting condition, transmits at the detecting positions the first ultra-wideband microwave signal to a plurality of second detected positions of the object.

The transmitting antenna 112 may be selected from a group consisting of the one-dimensional array antenna and the two-dimensional array antenna, or assembled on a mechanical scanning device, which is capable of moving along a direction selected from an one-dimensional direction and a two-dimensional direction, so as to have the transmitting antenna 112 transmitting the first ultra-wideband microwave signal at the detecting positions.

The receiving unit 121 is electrically connected to the receiving antenna 122. The receiving antenna 122 is utilized for receiving the second ultra-wideband microwave signal and transmitting the second ultra-wideband microwave signal to the receiving unit 121 so as to have the receiving unit 121 transmitting the second ultra-wideband microwave signal to the signal processing module 13. Under the initial condition, the receiving antenna 122 receives at the detecting positions at least one second ultra-wideband microwave signal reflected from the first detected positions, and under the detecting condition, receives at the detecting positions the second ultra-wideband microwave signal reflected from the second detected positions.

The receiving antenna 122 may be selected from a group consisting of the one-dimensional array antenna and the two-dimensional array antenna, or assembled on a mechanical scanning device, which is capable of moving along a direction selected from an one-dimensional direction and a two-dimensional direction, so as to have the receiving antenna 122 receiving the second ultra-wideband microwave signal at the detecting positions.

The signal processing module 13 is utilized for analyzing a plurality of reference signal delay times for the second ultra-wideband microwave signal received at the detecting positions under the initial condition so as to analyze a plurality of reference distances between the first detected positions and the respective detecting positions accordingly to generate a reference gray-scale image of the object, and for analyzing a plurality of detecting signal delay times for the second ultra-wideband microwave signal received at the detecting positions under the detecting condition so as to analyze a plurality of detecting distances between the second detected positions and the respective detecting positions accordingly.

The transmitting antenna 112 transmits the first ultra-wideband microwave signal toward the first detected position under the initial condition and the second detected position under the detecting condition from the identical detecting position along the identical direction. The first detected position and the second detected position may be at the identical position or the different positions in views of motion of the object. The signal processor 131 analyzes a plurality of distance variations according to the reference distances and the respective detecting distances so as to present motion of the object in the reference gray-scale image according to the distance variations.

Figure 3:
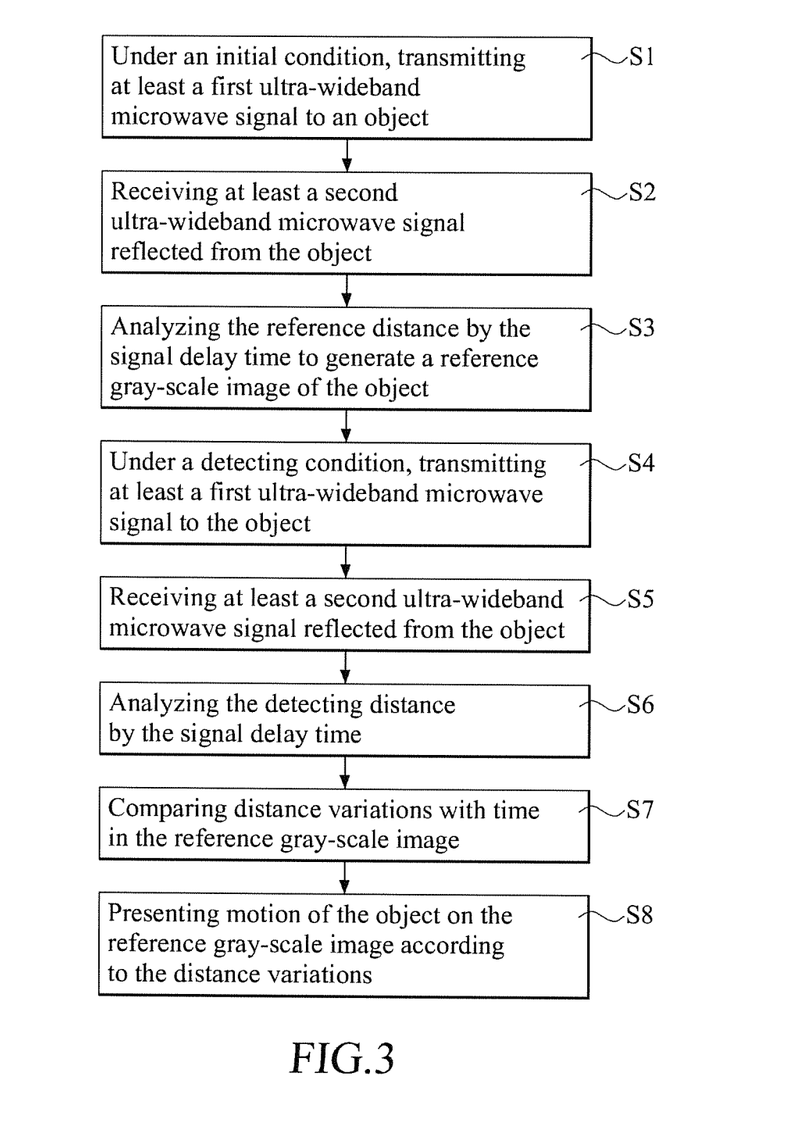
FIG. 3 is a flowchart showing a method of detecting motion of object by using ultra-wideband radar imaging in accordance with a preferred embodiment of the present invention.

Please referring to both FIG. 2 and FIG. 3, wherein FIG. 3 shows a flowchart of a method for detecting motion of the object by using ultra-wideband radar imaging in accordance with a preferred embodiment of the present invention.

As shown in FIG. 3, the method for detecting motion of object by using ultra-wideband radar imaging comprises the steps as below:

Step S1: under an initial condition, transmitting at least a first ultra-wideband microwave signal to an object;

Step S2: receiving at least a second ultra-wideband microwave signal reflected from the object;

Step S3: analyzing the reference distance by the signal delay time to generate a reference gray-scale image of the object;

Step S4: under a detecting condition, transmitting at least a first ultra-wideband microwave signal to the object;

Step S5: receiving at least a second ultra-wideband microwave signal reflected from the object;

Step S6: analyzing the detecting distance by using the signal delay time;

Step S7: comparing time-varying distance variations in the reference gray-scale image; and Step S8: presenting variation of motion of object on the reference gray-scale image according to the distance variations.

Under the initial condition, the step S1 is carried out to transmit at a plurality of detecting positions at least a first ultra-wideband microwave signal along a direction to a plurality of first detected positions of the object with respect to the detecting positions. Then, the step S2 is carried out to receive at the detecting positions at least a second ultra-wideband microwave signal reflected from the first detected positions of the object.

Afterward, the step S3 is carried out to analyze a plurality of reference signal delay times received at the detecting positions so as to analyze a plurality of reference distances between the first detected positions and the detecting positions to generate a reference gray-scale image of the object.

Under the detecting condition, the step S4 is carried out to transmit at a plurality of detecting positions at least one first ultra-wideband microwave signal along a direction identical to that in step S1 to a plurality of second detected positions of the object respective to the detecting positions. Then, the step S5 is carried out to receive at the detecting positions at least one second ultra-wideband microwave signal reflected from the second detected positions of the object.

Thereafter, the step S6 is carried out to analyze a plurality of reference signal delay times received at the detecting positions so as to analyze a plurality of detecting distances between the second detected positions and the detecting positions.

Then, the step S7 is carried out to compare the time-varying distance variations of the reference distances and the detecting distances at the detecting positions in the reference gray-scale image. Finally, the step S8 is carried out to transform distance variations into energetic form by using Fourier transformation. The imaging factors are defined by energetic form, which can be at least one of the factors selected from the generalized coherence factor (GCF), the generalized incoherence factor (GICF), and the filter bank based generalized coherence factor (FBGCF). The reference gray-scale image presents motion of the object. The strength and weakness of the gray-scale image is relevant to the received energetic intensity.

Through the analysis of imaging coherence as well as the adoption of a generalized incoherence factor method and a filter bank based generalized coherence factor method, the position of the moving object as well as the frequency of motion can be identified. Wherein, because the value of the generalized incoherence factor increases when the object is in motion at a position, the incoherence factor method can be used to detect and present the spatial position of the object. Because the filter bank based generalized coherence factor shows an increasing of value within the filter when the object has motion corresponding to the identical frequency, the filter bank based generalized coherence factor can be used to detect and present the spatial position of the object and the frequency of motion.

The above mentioned step S1 and step S4 are carried out by using a transmitter module 11 to transmit a first ultra-wideband microwave signal. In detail, the transmitting unit 111 is utilized for receiving a digital square wave generated and transmitted by a processing unit 132 of a signal processing module 13 and modulating the digital square wave into a first ultra-wideband microwave signal so as to transmit the first ultra-wideband microwave signal. The transmitting antenna 112 may be selected from a group consisting of the one-dimensional array antenna and the two-dimensional array antenna, or assembled on a mechanical scanning device, which is capable of moving along a direction selected from an one-dimensional direction and a two-dimensional direction, so as to have the transmitting antenna 112 transmitting the first ultra-wideband microwave signal at the detecting positions to the object. In addition, the above mentioned steps S3, S6, S7, and S8 are carried out by using the signal processor 131 of the signal processing module 13.

The above mentioned step S2 and step S5 are carried out by using the receiver module 12 to receive the second ultra-wideband microwave signal. In detail, the receiving antenna 122 of the receiver module 12 is utilized for receiving the second ultra-wideband microwave signal so as to transmit the second ultra-wideband microwave signal to the receiving unit 121 to have the receiving unit 121 transmitting the second ultra-wideband microwave signal to the signal processing module 13.

The receiving antenna 122 may be selected from a group consisting of the one-dimensional array antenna and the two-dimensional array antenna, or assembled on a mechanical scanning device, which is capable of moving along a direction selected from an one-dimensional direction or a two-dimensional direction, so as to have the receiving antenna 122 receiving the second ultra-wideband microwave signal at the detecting positions.

Figure 4:
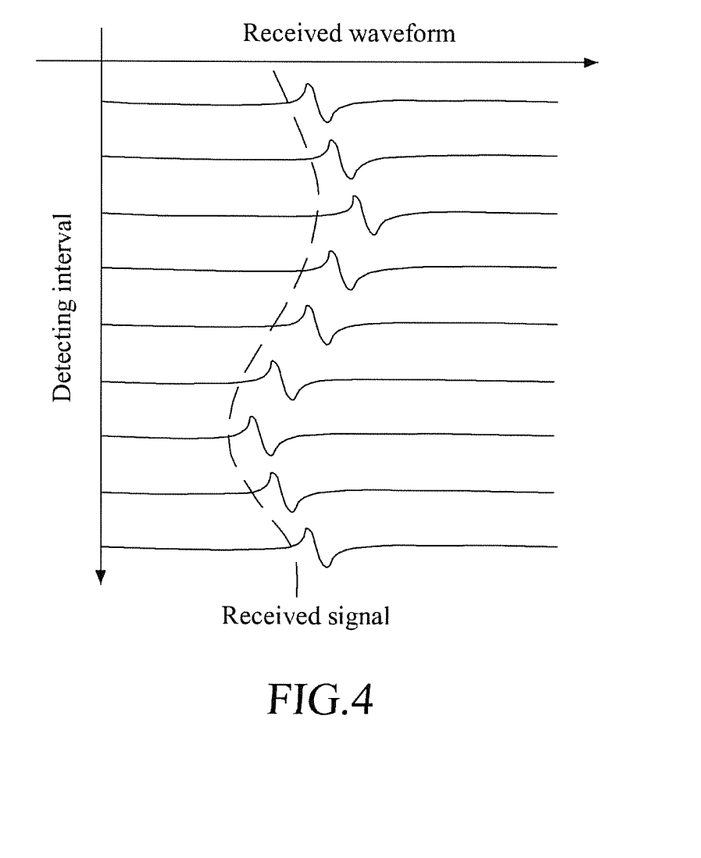
FIG. 4 is a signal sampling diagram of the ultra-wideband radar imaging system in accordance with the first preferred embodiment of the present invention.

Referring to FIG. 4, which shows a signal sampling diagram of the ultra-wideband radar imaging system in accordance with the first preferred embodiment of the present invention.

As shown in FIG. 4, assume the object is in motion, the second ultra-wideband microwave signal received at the detecting position will show the signal delay time. Thus, the first detected position under the initial condition and the second detected position under the detecting condition may be at the identical position or the different positions in views of whether the object is in motion. The detail description of the aforementioned preferred embodiments is for clarifying the feature and the spirit of the present invention. The present invention should not be limited by any of the exemplary embodiments described herein, but should be defined only in accordance with the following claims and their equivalents. Specifically, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A method for detecting motion of object by using ultra-wideband radar imaging comprising the steps of:
    (a) under an initial condition, from a plurality of detecting positions, transmitting at least a first ultra-wideband microwave signal along a direction to a plurality of first detected positions of a object, the first detected positions being respective to the detecting positions;
    (b) receiving at least a second ultra-wideband microwave signal at the detecting positions, the second ultra-wideband microwave signal being reflected from the first detected positions of the object;
    (c) analyzing a plurality of reference signal delay times for the second ultra-wideband microwave signal received at the detecting positions and analyzing a plurality of reference distances between the first detected positions and the respective detecting positions accordingly so as to generate a reference gray-scale image of the object;
    (d) under a detecting condition, from the detecting positions, transmitting the at least one first ultra-wideband microwave signal along the direction to a plurality of second detected positions of the object, the second detected positions being respective to the detecting positions;
    (e) receiving the at least one second ultra-wideband microwave signal at the detecting positions, the second ultra-wideband microwave signal being reflected from the second detected positions of the object;
    (f) analyzing a plurality of detecting signal delay times for the second ultra-wideband microwave signal received at the detecting positions, and analyzing a plurality of detecting distances between the second detected positions and the respective detecting positions accordingly;
    (g) in the reference gray-scale image, comparing time-varying distance variations between the reference distances and the detecting distances with respective to the detecting positions; and
    (h) presenting motion of the object in the reference gray-scale image according to the distance variations.

2. The method of claim 1, wherein the step (h) transforms the distance variations into energetic form to define image factors of at least one of coherence factor (GCF), generalized incoherence factor (GICF), and filter bank based generalized coherence factor (FBGCF), and presents motion of the object as well as frequency of motion of the object by using a generalized incoherence method and a generalized coherence method.

3. The method of claim 2, wherein the generalized incoherence method is utilized for detecting and presenting spatial position of the object.

4. The method of claim 2, wherein the generalized coherence method is utilized for detecting and presenting spatial position of the object as well as the frequency of motion of the object.

5. The method of claim 1, wherein the step (a) and the step (d) transmit the first ultra-wideband microwave signal by using a transmitter module.

6. The method of claim 5, wherein the transmitter module includes a transmitting unit and at least a transmitting antenna, the transmitting unit is electrically connected to a processing unit of a signal processing module for receiving a digital square wave generated and transmitted by the processing unit so as to modulate the digital square wave into the first ultra-wideband microwave signal and transmit the first ultra-wideband microwave signal.

7. The method of claim 6, wherein the signal processing module further comprises a signal processor, which electrically connected to the processing unit for executing the step (c), the step (f), the step (g) and the step (h).

8. The method of claim 6, wherein the transmitting antenna is electrically connected to the transmitting unit for receiving the first ultra-wideband microwave signal and transmitting the first ultra-wideband microwave signal to the object.

9. The method of claim 6, wherein the transmitting antenna is selected from a group consisting of an one-dimensional array antenna and a two-dimensional array antenna.

10. The method of claim 6, wherein the transmitting antenna is assembled on a mechanical scanning device, and the mechanical scanning device is capable of moving along a direction selected from an one-dimensional direction and a two-dimensional direction to have the transmitting antenna transmitting the first ultra-wideband microwave signal at the detecting positions.

11. The method of claim 1, wherein the step (b) and the step (e) receive the second ultra-wideband microwave signal by using a receiver module.

12. The method of claim 11, wherein the receiver module includes a receiving unit and at least a receiving antenna, the receiving unit is electrically connected to the receiving antenna, and the receiving antenna is utilized for receiving the second ultra-wideband microwave signal and transmit the second ultra-wideband microwave signal to the receiving unit to have the receiving unit transmit the second ultra-wideband microwave signal to a signal processing module.

13. The method of claim 12, wherein the receiving antenna is selected from a group consisting of an one-dimensional array antenna and a two-dimensional array antenna.

14. The method of claim 12, wherein the receiving antenna is assembled on a mechanical scanning device, and the mechanical scanning device is capable of moving along a direction selected from an one-dimensional direction and a two-dimensional direction to have the receiving antenna receiving the second ultra-wideband microwave signal at the detecting positions.

15. The method of claim 1, wherein the first detected positions are identical to or different from the second detected positions.

16. An ultra-wideband radar imaging system for detecting motion of object, comprising:
   a transmitter module, utilized for transmitting a first ultra-wideband microwave signal from a plurality of detecting positions to a plurality of first detected positions of a object under an initial condition, and for transmitting the first ultra-wideband microwave signal from the detecting positions to a plurality of second detected positions of the object under a detecting condition;
   a receiver module, utilized for receiving at least a second ultra-wideband microwave signal at the detecting positions under the initial condition, the second ultra-wideband microwave signal being reflected from the first detected positions, and for receiving the second ultra-wideband microwave signal at the detecting positions under the detecting condition, the second ultra-wideband microwave signal being reflected from the second detected positions;
   a signal processing module, electrically connected to the transmitter module and the receiver module, for analyzing a plurality of reference signal delay times for the second ultra-wideband microwave signal received at the detecting positions under the initial condition so as to analyze a plurality of reference distances between the first detected positions and the respective detecting positions accordingly to generate a reference gray-scale image of the object, and for analyzing a plurality of detecting signal delay times for the second ultra-wideband microwave signal received at the detecting positions under the detecting condition so as to analyze a plurality of detecting distances between the second detected positions and the respective detecting positions accordingly;
   wherein the signal processing module analyzes time-varying distance variations according to the reference distances and the respective detecting distances and presents motion of the object in the reference gray-scale image according to the distance variations.

17. The system of claim 16, wherein the signal processing module includes a processing unit for generating and transmitting a digital square wave.

18. The system of claim 17, wherein the transmitter module comprises a transmitting unit and at least a transmitting antenna, the transmitting unit is electrically connected to the processing unit for receiving the digital square wave and modulating the digital square wave into the first ultra-wideband microwave signal so as to transmit the first ultra-wideband microwave signal.

19. The system of claim 18, wherein the transmitting antenna is electrically connected to the transmitting unit for receiving the first ultra-wideband microwave signal and transmitting the first ultra-wideband microwave signal to the object.

20. The system of claim 18, wherein the transmitting antenna is selected from a group consisting of an one-dimensional array antenna and a two-dimensional array antenna.

21. The system of claim 18, wherein the transmitting antenna is assembled on a mechanical scanning device, and the mechanical scanning device is capable of moving along a direction selected from an one-dimensional direction and a two-dimensional direction to have the transmitting antenna transmitting the first ultra-wideband microwave signal at the detecting positions.

22. The system of claim 16, wherein the receiver module comprises a receiving unit and at least a receiving antenna, the receiving unit is electrically connected to the receiving antenna, and the receiving antenna is utilized for receiving the second ultra-wideband microwave signal and transmitting the second ultra-wideband microwave signal to the receiving unit to have the receiving unit transmitting the second ultra-wideband microwave signal to the signal processing module.

23. The system of claim 22, wherein the receiving antenna is selected from a group consisting of an one-dimensional array antenna and a two-dimensional array antenna.

24. The system of claim 22, wherein the receiving antenna is assembled on a mechanical scanning device, and the mechanical scanning device is capable of moving along a direction selected from an one-dimensional direction and a two-dimensional direction to have the receiving antenna receiving the second ultra-wideband microwave signal at the detecting positions.

\* \* \* \* \*